United States Patent [19]
Carnarius

[11] 3,903,918
[45] Sept. 9, 1975

[54] DRAIN WITH CHECK VALVE

[76] Inventor: Clarence L. Carnarius, 215 N. Main St., Kenton, Ohio 43326

[22] Filed: Aug. 19, 1974

[21] Appl. No.: 498,517

[52] U.S. Cl. ............................................. 137/433
[51] Int. Cl.² ...................................... F16K 31/22
[58] Field of Search .. 137/433, 202, 533.11, 533.13

[56] References Cited
UNITED STATES PATENTS

| | | | |
|---|---|---|---|
| 690,046 | 12/1901 | Bickel | 137/533.13 |
| 783,493 | 2/1905 | Wood | 137/533.13 X |
| 859,540 | 7/1907 | Bonnell | 137/433 |
| 1,046,741 | 12/1912 | Dehn | 137/433 |
| 1,261,044 | 4/1918 | McCracken | 137/202 |
| 2,274,968 | 3/1942 | O'Bannon | 137/533.13 X |
| 2,476,434 | 7/1969 | Spang | 137/433 |

*Primary Examiner*—Alan Cohan

[57] ABSTRACT

A vertically disposed hollow pipe contains a buoyant spherical ball whose exterior diameter is less than the interior diameter of the pipe and which is free to move upwardly or downwardly therein. The downward motion of the ball is limited by a V shaped member welded into the interior of the pipe with the open side of the V facing upwardly towards the top of the pipe. The ball is limited in its upward motion by a plug threaded in the pipe, the plug bearing a cylindrical cavity extending through the plug concentric with the interior of the pipe but having a diameter less than the exterior diameter of the ball. The design of the device is such that it can be made with the plug threaded in the top or with a circular disc molded on, with a cylindrical cavity extending through the disc concentric with the interior of the pipe but having a diameter less than the exterior diameter of the ball.

2 Claims, 3 Drawing Figures

DRAIN WITH CHECK VALVE

SUMMARY OF THE INVENTION

The invention is directed towards a drain which will prevent water from backing up the drain into the area being drained, such as a cellar.

To this end, a buoyant spherical ball is disposed inside a vertically disposed hollow pipe which extends upward into the area to be drained. The top of the pipe will usually be aligned flush with the bottom of the floor drain cavity in the floor.

The ball is free to move up and down within the pipe because its diameter is less than that inside the pipe, and is limited in its downward motion by a lower stop. This stop allows the ball to be arrested in its downward motion while permitting water to flow in the pipe past the stop in either direction.

The upward motion of the ball is limited by an upper stop, which shuts off the flow of water when the stop is arresting the upward motion of the ball.

Thus, when water is flowing down into the pipe, the ball rests on the lower stop and the water flows past the lower stop into the pipe. But when the water level in the pipe rises past the level of the lower stop, the ball rises until it hits the upper stop, closing off the pipe from the area to be drained and preventing the water in the pipe from flowing up into the area.

DETAILED DESCRIPTION OF PREFERRED EMBODIMENTS

Figure 1:
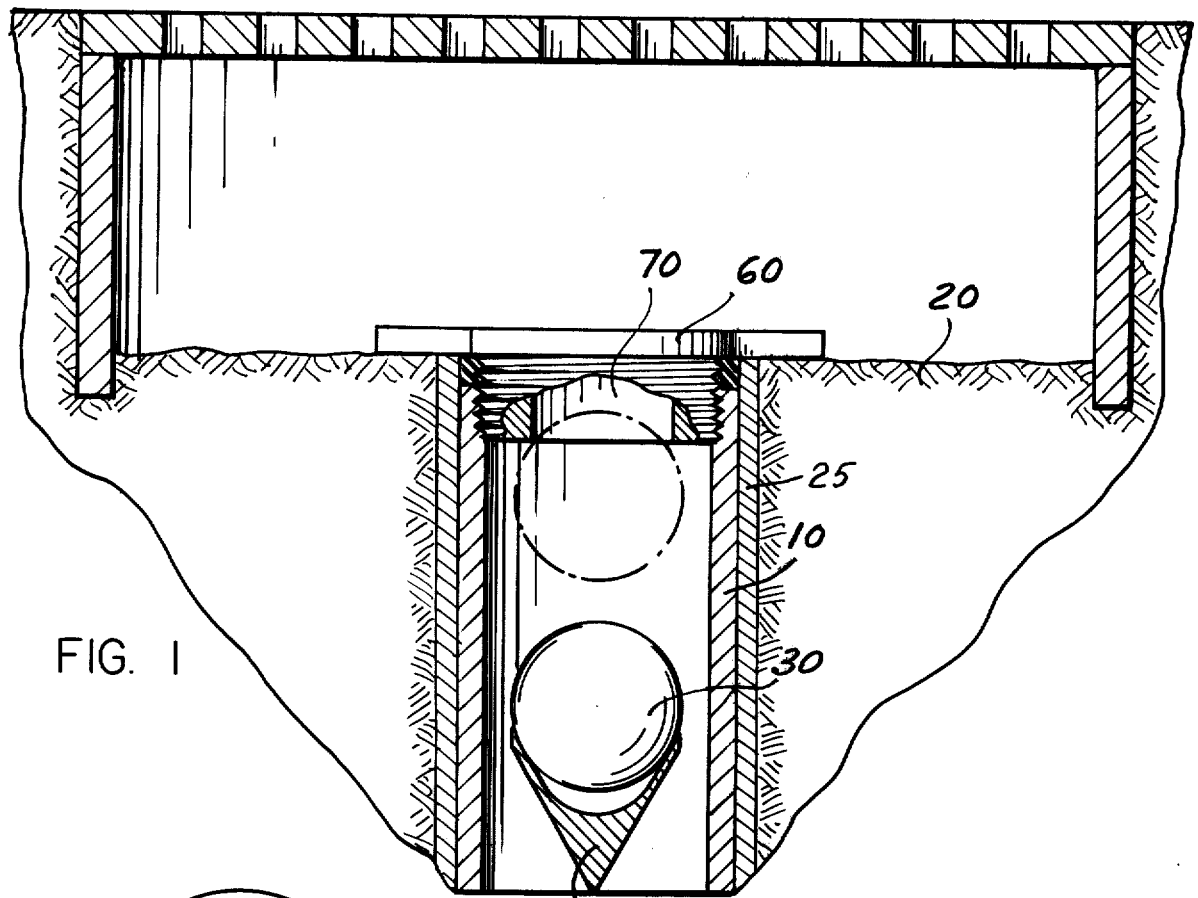
FIG. 1 is a side view of the invention in use.
Figure 2:
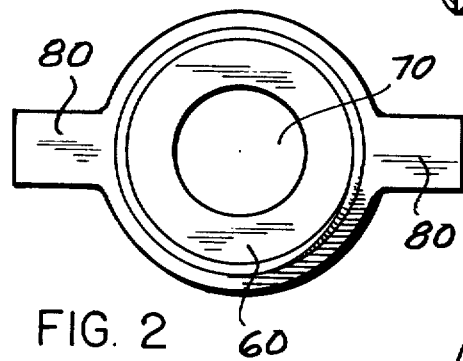
FIG. 2 is a top view of the plug of the invention.
Figure 3:
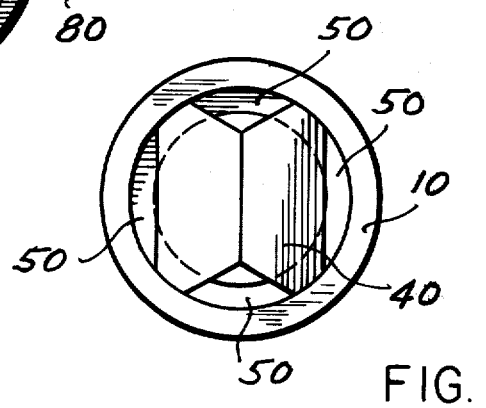
FIG. 3 is a bottom view of the lower stop of the invention.

Referring now to the drawings, a hollow vertically disposed pipe 10 is placed inside the floor drain pipe 25 in a cellar and is aligned flush with the bottom of the drain cavity in the floor. The pipe contains a buoyant spherical ball 30 which is free to move up or down in the pipe because its diameter is less than that inside the pipe, but which is limited in its downward movement by a V shaped member or other design 40, welded into the pipe with the open side of the V facing upwardly towards the top of the pipe. As can be seen in FIG. 3, spaces 50 between the member and the pipe allow water in the pipe to flow upward or downward past the member.

A plug 60 threads into the interior of the pipe at its top, and bears a cylindrical cavity 70 which extends through the top and bottom of the plug concentric with the interior of the pipe, but having a smaller diameter than the ball. Two opposed tabs 80 disposed on the top of the plug extend outwardly from the center of the plug on the top of the device to aid in its application into the drain pipe.

Thus, when water is draining down into the pipe, the ball rests on the member and the water passes through the cavity in the plug, past the ball and thence down into a drain system (not shown). However, if the water level in the pipe rises past the member, the ball floats up unitl it is pressed against the plug, blocking the cavity and preventing the water from flowing back into the cellar.

The design of the upper stop can also take the form of a flat circular disc molded on the device, with a cylindrical cavity extending through the disc and concentric with the interior of the pipe but smaller in diameter than the diameter of the ball.

While the invention has been described with detailed reference to the drawings, the protection sought is to be limited only by the terms of the claims which follow.

1. A drain comprising:

a vertical hollow pipe;

a bouyant spherical ball located inside the pipe and having a diameter less than the inside diameter of the pipe so as to be free to move up and down inside it;

an upper stop in the top of the pipe for limiting the upward movement of the ball and preventing the influx and efflux of water into and from the pipe when the upward movement of the ball has been physically checked by the upper stop, the upper stop taking the form of a plug threaded into the top of the pipe, the plug bearing a cylindrical cavity smaller in diameter than the diameter of the ball extending through it concentrically with the inside of the pipe and bearing two opposed tabs extending radially outwardly from its center on its upper surface; and a lower stop in the pipe below the upper stop for limiting the downward motion of the ball while allowing water to flow upwardly or downwardly past the lower stop and preventing the air pressure head from raising the ball and thus closing the drain before the arrival of flood water, the lower stop taking the form of a U-shaped member welded into the pipe with the open side of the U facing upwardly and extending a substantial distance across the pipe so as to contact the pipe at four separated locations.

2. The device of claim 1 wherein the ball is made of plastic.

* * * * *